(No Model.)

J. L. THOMAS.
CROSS CLEVIS.

No. 595,503. Patented Dec. 14, 1897.

WITNESSES:

INVENTOR
J. L. Thomas

BY

ATTORNEYS.

THE NORRIS PETERS CO., PHOTO-LITHO., WASHINGTON, D. C.

UNITED STATES PATENT OFFICE.

JOHN LEWIS THOMAS, OF OSCEOLA, MISSOURI.

CROSS-CLEVIS.

SPECIFICATION forming part of Letters Patent No. 595,503, dated December 14, 1897.

Application filed March 24, 1897. Serial No. 629,042. (No model.)

*To all whom it may concern:*

Be it known that I, JOHN LEWIS THOMAS, of Osceola, in the county of St. Clair and State of Missouri, have invented a new and Improved Cross-Clevis, of which the following is a full, clear, and exact description.

The object of the invention is to provide a new and improved cross-clevis which is simple and durable in construction and arranged for convenient and accurate adjustment to any kind of a plow.

The invention consists of certain parts and details and combinations of the same, as will be hereinafter fully described and then pointed out in the claims.

Reference is to be had to the accompanying drawings, forming a part of this specification, in which similar characters of reference indicate corresponding parts in all the figures.

Figure 1:
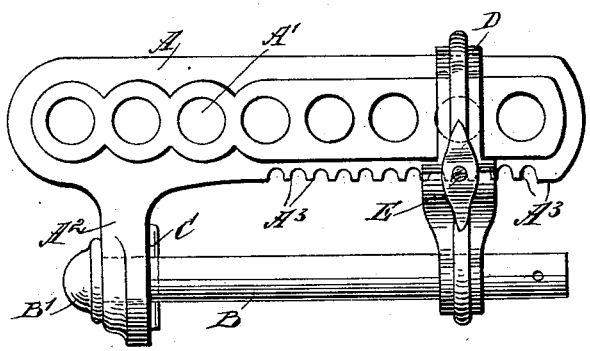
Figure 2:
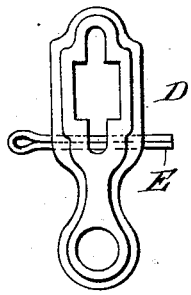
Figure 3:
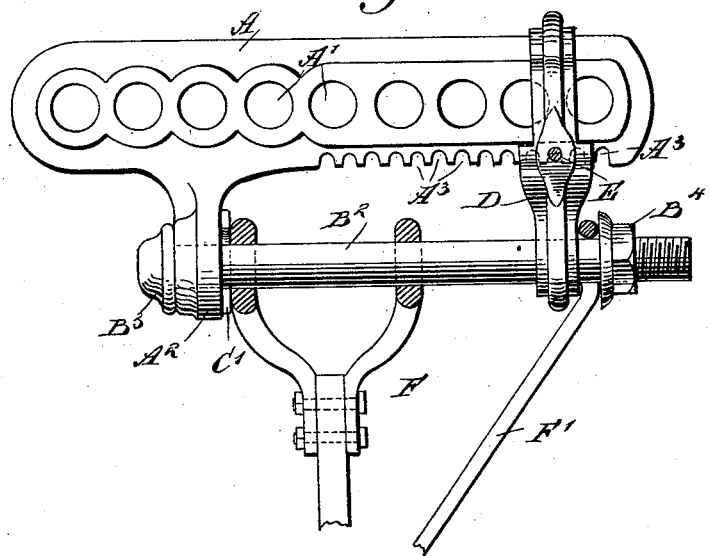
Figure 4:
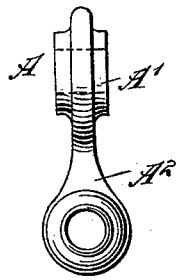

Figure 1 is a plan view of the improvement. Fig. 2 is an end elevation of the adjustable arm. Fig. 3 is a plan view of the improvement with a modified form of clevis-pin for use on a three-horse plow with a beam-brace, parts being in section; and Fig. 4 is an end elevation of the body of the clevis.

The improved cross-clevis is provided with a body A, formed with a number of apertures A', arranged one alongside the other for connection with the usual ring or other device. From one end of the body A extends a lug $A^2$, through which passes the clevis-pin B, formed at one end with a head B', resting on the outside of the lug $A^2$, and in the said body is arranged a linch or cotter pin C, fitting against the inner side of the said lug, so as to secure the pin B in place in the lug. The free end of the pin B is adapted to pass into an aperture formed in an arm D, mounted to slide longitudinally on the body A and adapted to be fastened in place thereon in any desired position by means of a linch or cotter pin E, held in the said arm and engaging one of a series of recesses $A^3$, formed in the inner edge of the body A.

As shown in Fig. 2, the arm D is formed with an eye D', the opening of which corresponds to the cross-section of the body A, so that the arm can be readily moved along the body to the desired position.

Now it will be seen that on withdrawing the pin E the arm D can be moved longitudinally on the body A, so as to adjust the clevis to the thickness of the plow-beam on which it is used, and after the desired adjustment has been made the pin E is again inserted, so as to securely lock the arm D in place. As before mentioned, the arm D engages the free end of the clevis-pin B and forms a bearing for the outer end thereof.

As shown in Fig. 3, the clevis-pin $B^2$ is different in construction from the one shown in Fig. 1—that is, the said pin is provided on one end with a head $B^3$ and at its free end is threaded to receive a nut $B^4$. A cotter-pin C' engages the clevis-pin $B^2$, so as to secure the same in place in the lug $A^2$, and the clevis-pin between the lug $A^2$ and the adjustable arm D is adapted to receive the forked end F of the plow-beam, while the eye of the brace F' is adapted to engage the said pin $B^2$ outside of the arm D and to be engaged and fastened in place by the nut $B^4$, screwed up on the outer threaded end of the pin $B^2$.

By the arrangement last described the clevis is readily applicable to a three-horse plow having a beam-brace, or to any other kind of a plow, as before mentioned.

Having thus described my invention, I claim as new and desire to secure by Letters Patent—

1. A cross-clevis comprising a clevis-body, a pin held removable on a lug of the said body, an arm fitted to slide on the said body and adapted to receive the free end of the clevis-pin and means for locking the said arm in place on the said body, substantially as shown and described.

2. A cross-clevis, comprising a clevis-body, a clevis-pin held removably on the said clevis-body, an arm held adjustably on the clevis-body and forming a bearing for the free end of the clevis-pin, and a cotter-pin extending through the said arm and engaging one of a series of recesses formed in the inner edge of the said clevis-body, to lock the arm in place on the body, substantially as shown and described.

JOHN LEWIS THOMAS.

Witnesses:
CHAS. J. HARRISON,
SAM A. SMITH.